Patented Feb. 1, 1927.

1,616,167

UNITED STATES PATENT OFFICE.

WILLIAM C. ARSEM, OF SCHENECTADY, NEW YORK, ASSIGNOR TO INDUSTRIAL TECH-NICS CORPORATION, OF SCHENECTADY, NEW YORK, A CORPORATION OF NEW YORK.

EXTRACTION AND PURIFICATION OF INULIN.

No Drawing. Application filed November 16, 1920, Serial No. 424,459. Renewed October 1, 1926.

The present invention relates to the recovery of inulin from juices containing it, as for instance the juices obtained from dahlia bulbs and similar sources.

The juices referred to are obtained by comminuting the inulin-containing material and expressing the sap therefrom or by comminuting and extracting, or by otherwise obtaining from the vegetable material, a liquor containing the inulin in a more or less soluble form or in the form of a colloid associated or combined with impurities. In my process such juice is first subjected to a clarifying operation having for its object to increase the purity and final yield of the inulin and to convert the impurities into such form that their subsequent removal by filtration is rendered somewhat easier. After filtration, the filtrate is subjected to a decolorizing operation, supplemented in some instances by the removal of additional small quantities of organic impurities present in the clarifying juice. Finally, the clear solution obtained is concentrated to promote the separation of inulin therefrom, and this process is aided preferably by the addition of inulin to the liquid either in powdered form or in suspension in water—the added inulin acting as seed to accelerate the separation of the inulin contained in the solution. Subsequently, the mixture containing the precipitated inulin is filtered and the inulin obtained from the filtration is thoroughly washed with pure water until the washings are colorless. Further purification of the inulin may be effected by redissolving it, again clarifying, decolorizing, seeding, separating and washing, as will hereinafter more fully appear.

In the practice of the invention, in its preferred form, the initial clarification of the inulin-containing juice is effected by adding to the juice substantially equivalent quantities of calcium hydroxide and calcium chloride, the addition being made carefully in the cold until the thoroughly stirred mixture is just alkaline to methyl red paper. The clarifying solution referred to is preferably made by grinding calcium hydroxide with a solution of calcium chloride so as to make a smooth cream. The mixture of the clarifying solution and juice is then heated, preferably to about 75° C., or even less, until a large part of the impurities become coagulated and examination shows that filtration will be successful. The impurities thus coagulated settle out in a form easily removed by filtration. In some instances, the liquid will now have become faintly acid, but in general it will be preferable to add a little more of the clarifying solution after the mixture is heated, or while it is being heated in order to make it slightly alkaline to methyl red paper, but excessive alkalinity must be carefully avoided, in order to prevent the formation of slimy products by the hydrolysis of the albuminous and similar constituents of the sludge.

After removal of the separated impurities in this first stage of the clarifying process the filtrate is treated with more of the clarifying solution until a faint alkaline reaction to methyl red paper is obtained in the heated liquid, whereupon a further coagulation of impurities takes place and these are removed by a second filtration.

The liquid is now quite clear and free from impurities of a gummy or albuminous nature, but still contains substances which give it more or less color. I prefer to treat the liquid, therefore, with boneblack or a like decolorizing agent of a character which will adsorb coloring substances of the kind present in a liquid, whereupon a considerable portion of the coloring substances will be removed, including some impurities which would, if left in the solution, have a tendency to be adsorbed by the inulin which separates out from the solution in a later stage of the process.

If desired, I may, at this stage of the process, after the addition of the boneblack or like decolorizing agent, add a sodium carbonate solution to the clarified juice until the juice is alkaline to phenol phthalein, thereby precipitating the calcium present in the form of calcium carbonate which carries down with it further small quantities of organic impurities, which may then be removed by filtration. The solution, in this case, can then be brought back nearly to the neutral point as indicated by methyl red indicator by adding acid capable of neutralizing sodium carbonate for that purpose.

The clear solution obtained by the treatment with boneblack, or the clear solution obtained by the further addition of sodium carbonate and which is then brought back nearly to the neutral point by adding acid, is then evaporated until the concentration of inulin is about 10%, or even more. The solution is then allowed to cool and acetic acid is added to promote the separation of the inulin until the acetic acid concentration is about .01N. A small amount of powdered inulin, or a suspension of inulin in water is then added to act as seed, and the liquid is allowed to stand quietly, or with slow agitation until separation of the inulin is practically complete, which requires 16 to 48 hours. The mixture is then stirred until it assumes the consistency of smooth cream when it is filtered in any approved manner and the inulin is washed thoroughly with pure water until the washings are colorless.

The inulin thus obtained, although almost free from impurities, can be subjected to a further purification, if desired, by redissolving it in hot water which, to prevent hydrolysis, should contain a very small quantity of sodium carbonate. By the use of diatomaceous earth and decolorizing carbon, separately or jointly the solution is clarified and decolorized. The filtered clear liquor is then cooled and made .01N acid by the addition of acetic acid, seeded, and the inulin separated and washed as hereinbefore described.

It has been found that there is particular advantage in adding the clarifying agent (consisting of calcium hydroxide and calcium chloride) in two stages so that the major portion of the impurities may be separated out and removed in the first stage and the residual impurities separated out and removed from the filtered product of the first stage. So also, as hereinbefore noted it is desirable to restrict the amount of clarifying agent added to an amount which will produce only a slight alkalinity to methyl red, so as to avoid the production of slimy substances which would tend to increase the difficulty of filtering the liquid. In referring, in the foregoing description, to the use of equivalent amounts of calcium hydroxide and calcium chloride it is intended to indicate that the practice in most cases will be to use these two substances in amounts substantially proportional to their equivalent weights. It will, of course, be understood that there may be substituted for the calcium hydroxide and calcium chloride, their chemical equivalents in the reactions which they bring about. Thus any salt may be substituted for the calcium chloride which has the power when used alone of precipitating some of the impurities and simultaneously causing an increase in the acidity of the liquor and any base may be substituted for the calcium hydroxide which can neutralize the acid thus produced without decomposing or precipitating the inulin or causing the precipitated impurities to become slimy and difficult to remove by filtration. Also the said salt and said base may be added alternately in relatively small amounts.

Instead of calcium chloride and calcium hydroxide for the purification mixture I may use such combinations as aluminum chloride and aluminum hydroxide, magnesium sulphate and magnesium hydroxide. In these combinations I prefer to use as a basic substance the hydroxide of the metal corresponding to the neutral salt used, but I may use other basic substances, such as sodium hydroxide, sodium acetate, sodium phosphate. For neutral salts I may use such salts of the heavy metals, the alkaline earth metals and rare earth metals as conform to the requirements already mentioned.

What I claim is:

1. In the recovery of inulin from juices containing it, the method of clarifying the juice which comprises subjecting it to the action of a mixture of calcium hydroxide and calcium chloride; substantially as described.

2. In the recovery of inulin from juices containing it, the method of clarifying the juice which comprises subjecting it to the action of a mixture of calcium hydroxide and calcium chloride in substantially equivalent amounts; substantially as described.

3. In the recovery of inulin for juices containing it, the method of clarifying the juice which comprises subjecting it to the action of a mixture of calcium hydroxide and calcium chloride in an initial step of the operation and thereby separating out a large part of the impurities, removing the impurities thus separated, and subjecting the filtrate, in a second step of the operation, to the action of an additional quantity of the clarifying mixture; substantially as described.

4. In the operation described in claim 3, adding the mixture of calcium hydroxide and calcium chloride to the juice in the cold; substantially as described.

5. In the operation described in claim 3 adding the mixture of calcium hydroxide and calcium chloride to the juice, in the first stage of the clarification, in the cold and then heating the mixture up to the point where the impurities to be removed during the first step become coagulated and settle out in a form adapted for removal by filtration; substantially as described.

6. In the recovery of inulin from juices containing it, effecting the preliminary coagulation of impurities therein by subjecting the juice to the action of a mixture of calcium hydroxide and calcium chloride, and then decolorizing the clarified juice and removing further impurities therefrom, by subjecting it to the action of an adsorbing decolorizing agent; substantially as described.

7. In the recovery of inulin from juices containing it, effecting the preliminary coagulation of impurities therein by subjecting the juice to the action of a mixture of calcium hydroxide and calcium chloride, then decolorizing the clarified juice and removing further impurities therefrom, by subjecting it to the action of an adsorbing decolorizing agent, and adding a solution of sodium carbonate to precipitate the calcium as carbonate; substantially as described.

8. In the recovery of inulin from juices containing it without freezing the juice, the steps of neutralizing the alkalinity of a clarified solution containing inulin, concentrating by evaporation and treating the concentrated, neutralized, clarified solution to separate out inulin.

9. In the recovery of inulin from juices containing it without freezing the juice, the step of neutralizing a clarified solution of the juices, concentrating the inulin therein by evaporation and separating out the inulin from the concentrated solution by seeding.

10. In the recovery of inulin from juices containing it without freezing the juice, the steps of neutralizing the alkalinity of a clarified solution containing inulin, concentrating the solution by evaporation, and acidifying the concentrated clarified solution to separate out inulin.

11. In the recovery of inulin from juices containing it without freezing the juice, the steps of neutralizing the alkalinity of a clarified solution containing inulin, concentrating the solution by evaporation and treating the concentrated clarified solution with acetic acid to separate out the inulin.

12. In the recovery of inulin from juices containing it without freezing the juice, the steps of neutralizing the alkalinity of a clarified solution until the solution is neutral to a methyl red indicator, concentrating the solution by evaporation and treating the neutralized, concentrated, clarified solution to separate out inulin.

In testimony whereof I affix my signature.

WILLIAM C. ARSEM.